United States Patent
Torok

[11] 3,792,297
[45] Feb. 12, 1974

[54] RELUCTANCE MACHINE HAVING EQUALIZING WINDINGS

[75] Inventor: Vilmos Torok, Nordanvindsgatan 6, Vasteras, Sweden

[73] Assignee: Allmanna Svenska Elektriska Aktiebolaget, Vasteras, Sweden

[22] Filed: Dec. 30, 1971

[21] Appl. No.: 213,938

[30] Foreign Application Priority Data
Dec. 31, 1970 Sweden .............................. 7017849

[52] U.S. Cl. ................................. 310/183, 310/211
[51] Int. Cl. ............................................. H02k 3/16
[58] Field of Search .................... 310/162–164, 168, 310/177, 183, 186, 196, 197, 210–212, 51, 213

[56] References Cited
UNITED STATES PATENTS

| | | | |
|---|---|---|---|
| 3,163,788 | 12/1964 | Powers | 310/261 X |
| 1,607,287 | 11/1926 | Laffoon | 310/211 X |
| 1,783,064 | 11/1930 | Wachsmann | 310/183 |
| 2,037,532 | 4/1936 | Morrill | 310/212 |
| 767,787 | 8/1904 | Whitney | 310/183 X |
| 3,230,487 | 1/1966 | Pellecchia | 310/183 X |
| 2,831,133 | 4/1958 | Hansen et al. | 310/183 |
| 3,408,556 | 10/1968 | Gabor | 310/168 UX |

*Primary Examiner*—J. D. Miller
*Assistant Examiner*—Mark O. Budd
*Attorney, Agent, or Firm*—Jennings Bailey, Jr.

[57] ABSTRACT

A reluctance machine has a stator with a plurality of stator poles arranged tangentially one after the other and carries at least one stator winding. The rotor has a plurality of pole pairs equally angularly spaced. The rotor has an equalizing winding composed of coils in the form of a hollow cylinder of conductive material provided with longitudinal slots extending alternately from opposite ends receiving the rotor poles, the parts of the cylinder between the slots being joined at alternate ends by arcuate parts, the induced voltages in the coils counteracting each other.

3 Claims, 2 Drawing Figures

PATENTED FEB 12 1974  3,792,297

INVENTOR.
VILMOS TOROK
BY

RELUCTANCE MACHINE HAVING EQUALIZING WINDINGS

BACKGROUND OF THE INVENTION

1. Field of the Invention

The present invention relates to a reluctance machine comprising a stator having a plurality of stator poles arranged tangentially one after the other and carrying at least one stator winding, and a rotor having a number of pole pairs, the angular position of one of the rotor poles of a pair in relation to its neighbouring stator poles always being the same as that of the other rotor pole of the pair.

2. The Prior Art

It is extremely important with relucatnce machines intended for DC operation that saturation of the pole material in the vicinity of the pole surfaces facing each other occurs with relatively great overlap, for example 75 percent. Consequently, a reluctance machine should have particularly high flux density even with full overlap. Asymmetry between the pole fluxes thus easily gives rise to damaging radial forces on the rotor body which may cause a rotor pole and a stator pole to come into contact with each other, for example. Even if this does not happen there is always the risk that deviations in dimensions during manufacture and assembly will increase still further during operation, thus causing the motor to run erratically.

SUMMARY OF THE INVENTION

The above-mentioned drawbacks are avoided by means of the invention in which a special equalizing winding is arranged on the rotor poles in such a way that any difference between the alterations in the pole flux of rotor poles arranged substantially diametrically to each other gives rise to a current flowing in the equalizing winding, which counteracts any difference in flux alteration per unit of angle of rotation.

The invention is characterised by providing on the rotor an equalizing winding formed of coils of conductive material and comprising a cylindrical body having slots thereinto alternately from opposite ends for receiving the rotor poles and arcuate parts connecting the portions of the cylinder between the slots alternately at opposite ends of the cylindrical body. The connection is such that the induced voltages in the coils, of which there is one for each pole, counteracts each other.

It has been found that a reluctance machine without equalizing windings, but otherwise having the same structure as the machine described above, places particularly high requirements on accuracy in manufacturing if impermissibly large radial bending forces on the rotor are to be avoided. However, the properties of the motor are in other respects extremely advantageous. In such a motor the improvements achieved by the equalizing winding more than justify the extra costs involved.

BRIEF DESCRIPTION OF THE DRAWINGS

In the following the invention will be described with reference to the accompanying drawings in which.

DESCRIPTION OF THE PREFERRED EMBODIMENTS

Figure 1:
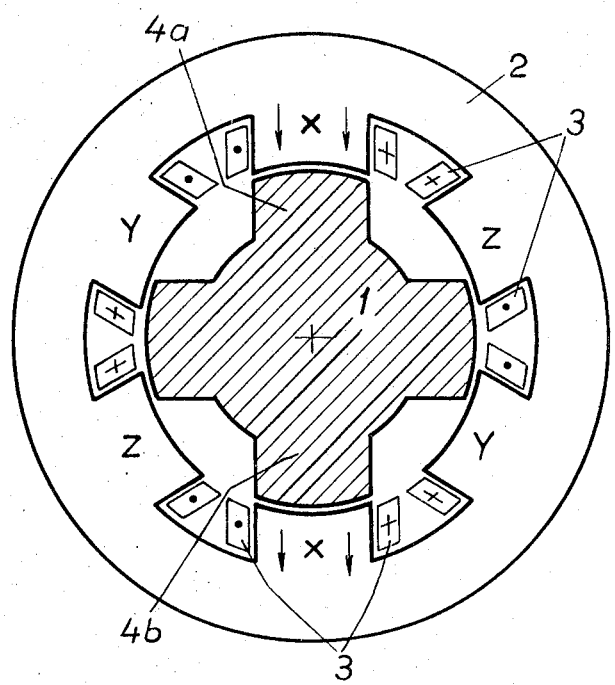
FIG. 1 shows a cross section of a machine according to the invention, the equalizing winding being omitted for the sake of clarity.

In the drawings 1 designates the rotor and 2 the stator of a reluctance machine. The stator has three pairs of stator poles, $x-x$, $y-y$ and $z-z$, the poles in each pair cooperating with each other and being provided with individual stator coils 3. The two stator coils of a pole pair form a phase winding and the stator therefore has three phase windings intended to be connected to individual controlled DC sources.

Figure 2:
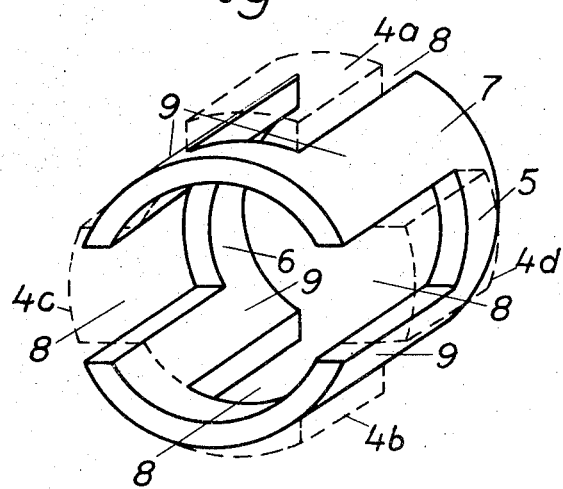
FIG. 2 shows an axonemetric projection of the rotor shown in FIG. 1 with its equalizing winding, the rotor being indicated by dotted lines.

FIG. 2 shows an equalizing winding 7 for the rotor poles $4a$, $4b$, $4c$, $4d$. It comprises a hollow cylinder made of conducting material, provided with longitudinal slots 8 for the rotor poles $4a$, $4b$, $4c$ and $4d$. The axial extension of the slots constitutes only a part of the length of the cylinder, consecutive slots extending from different ends of the cylinder. The parts 9 of the hollow cylinder located between the slots are joined together by means of peripherally running arcuate parts 5 and 6 of the hollow cylinder at alternate ends thereof. The axially running parts 9 and the arcuate parts 5 and 6 form a coil system which surrounds each of the poles $4a - 4d$ on three sides and forms a short-circuited current circuit. The magnetic flux through the poles $4a$ and $4b$ is directed as indicated by arrows in FIG. 1.

If the machine is symmetrical, the resultant voltage induced in the above-mentioned current circuit upon a rotor motor will be equal to zero. If, on the other hand, some imperfection should cause the flux through the rotor pole $4a$ to differ from the flux through the rotor pole $4b$, a current will be induced in the short-circuited equalizing winding and the difference will be counteracted by the fact that it increases the flux of one rotor pole and decreases the flux in the other.

It can easily be seen from the drawing that the same equalizing effect can be achieved for the rotor pole pair $4c-4d$.

I claim:

1. Reluctance machine comprising a stator having a plurality of stator poles arranged tangentially one after the other and carrying at least one stator winding, and a rotor having a number of pole pairs, the angular position of one of the rotor poles of a pair in relation to its neighboring stator poles always being the same as that of the other rotor pole of the pair, in which at least one rotor pole pair is provided with a short-circuited equalizing winding comprising one coil for each pole and means series-connecting the two coils, said connecting means being connected between coil ends of equal polarities as regards voltages induced in the two coils upon a movement of the rotor.

2. Reluctance machine according to claim 1, in which the machine has three pairs of diametrically arranged stator poles and two pairs of diametrically arranged rotor poles, the stator carrying a stator winding for each stator pole pair.

3. Reluctance machine according to claim 1, in which said equalizing winding comprises a hollow cylinder made of conducting material and having slots extending inwardly alternately from each end for receiving the rotor poles, the axial extension of said slots constituting only a part of the length of the cylinder.

* * * * *